INVENTOR
TAKEO KATO AND
TOSHIYUKI TAKAHASHI

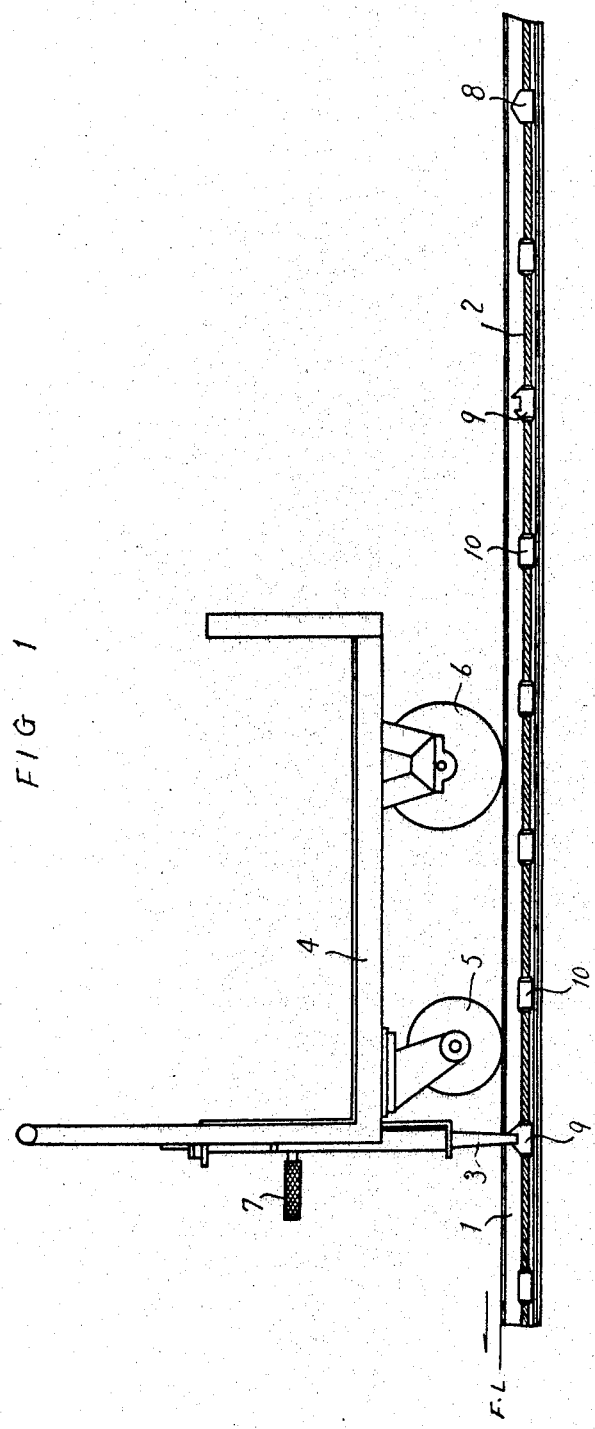
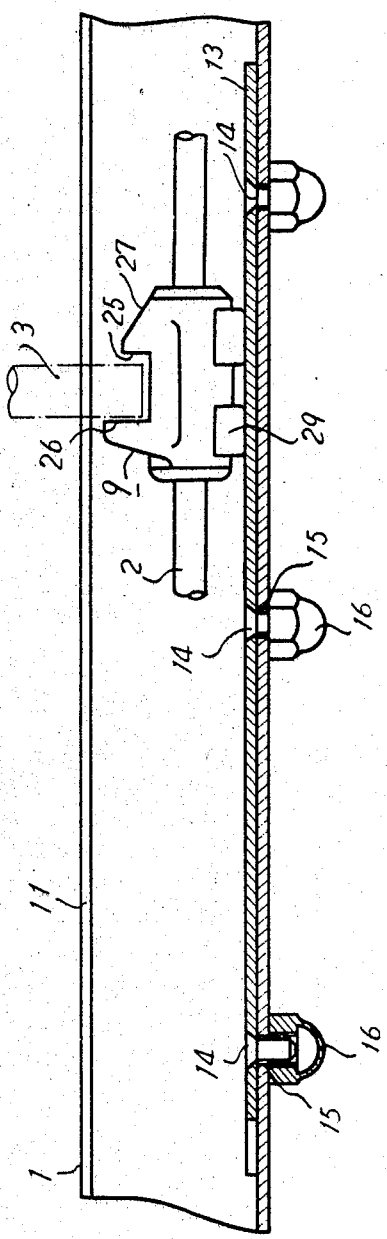

BY Linton and Linton
ATTORNEYS

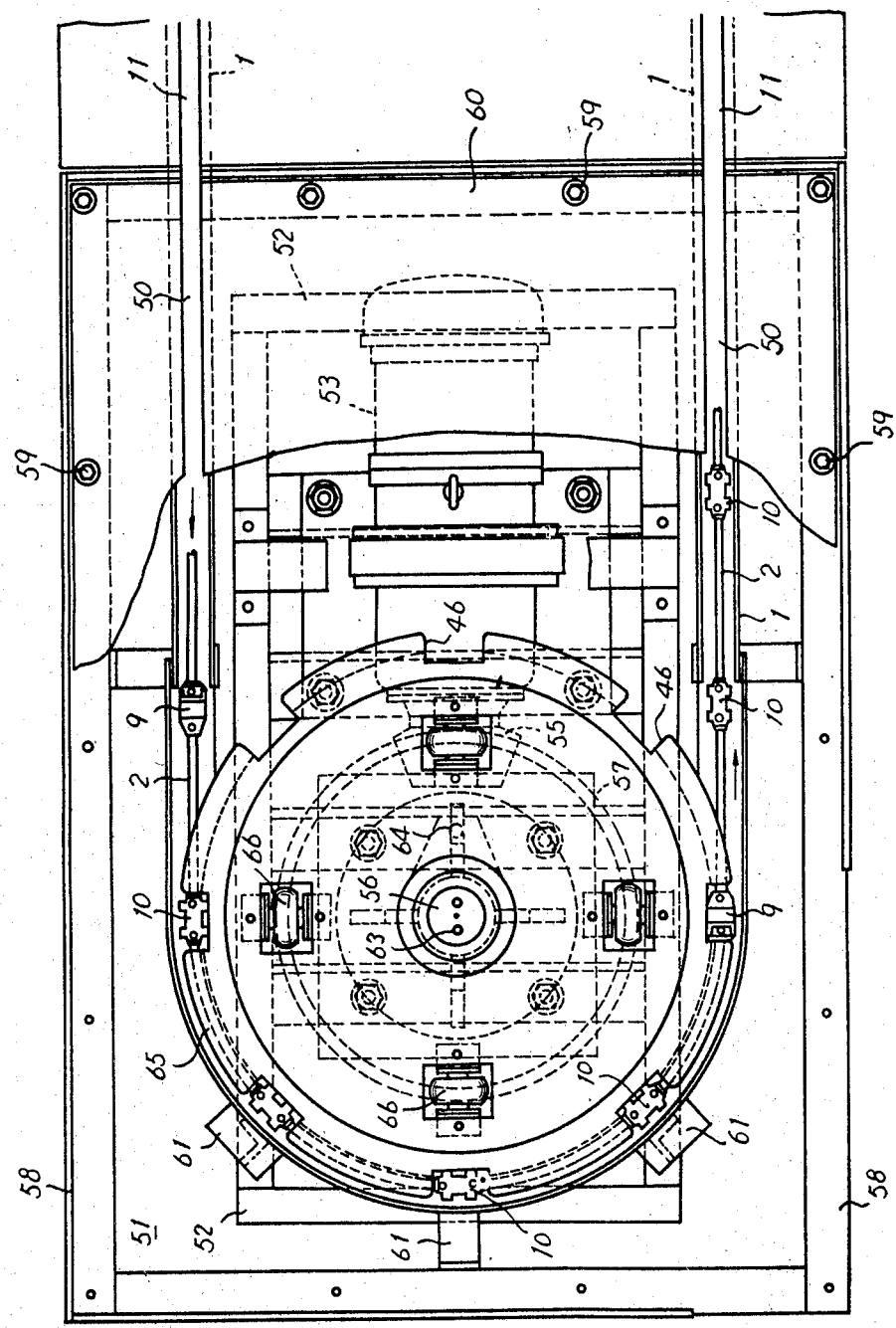

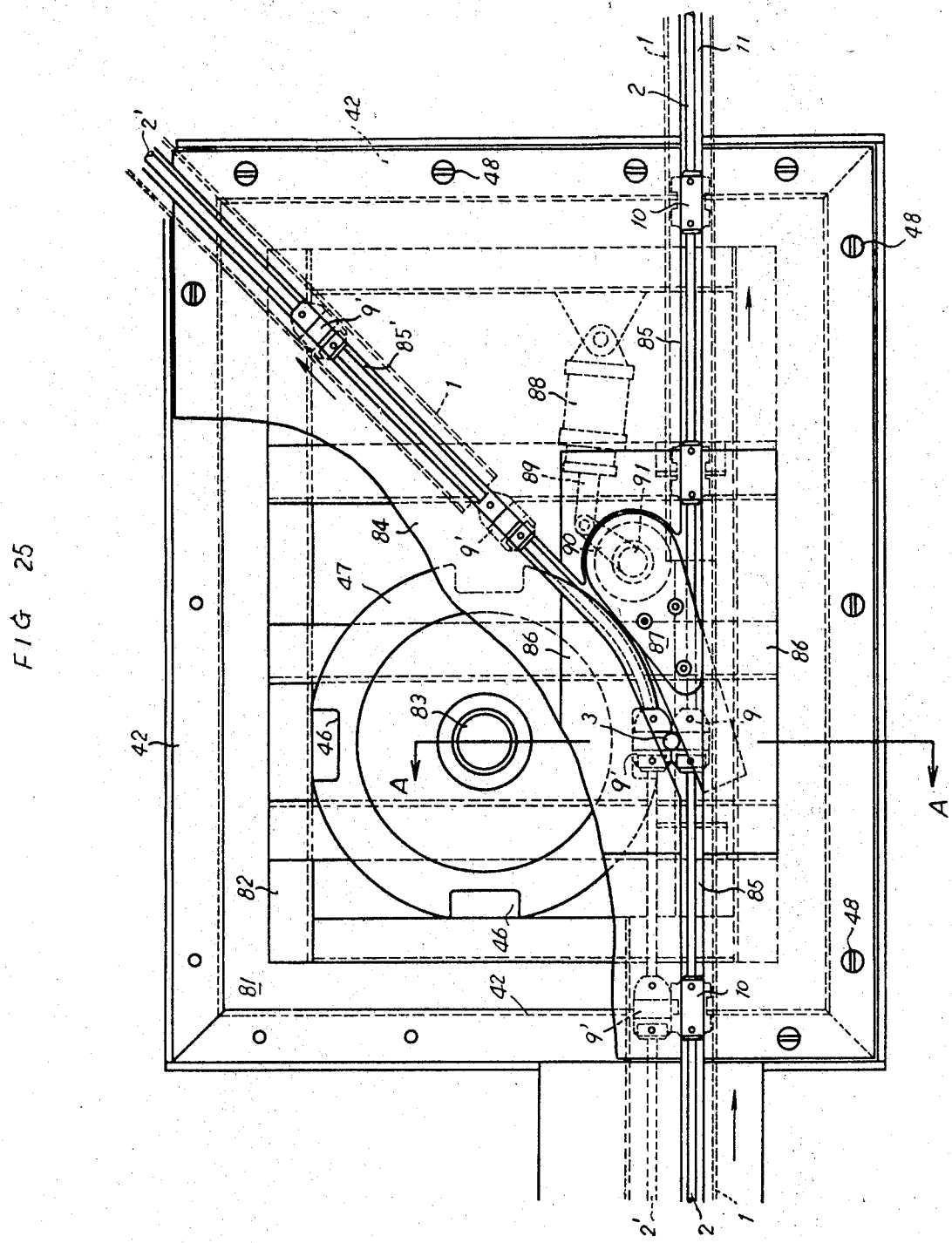

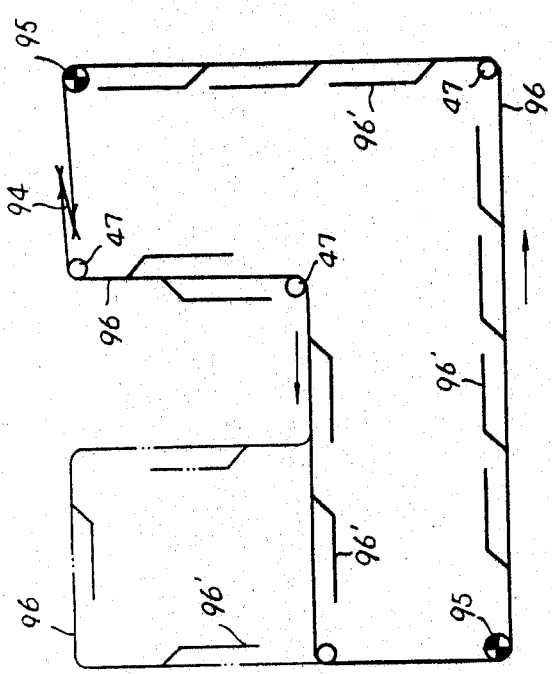
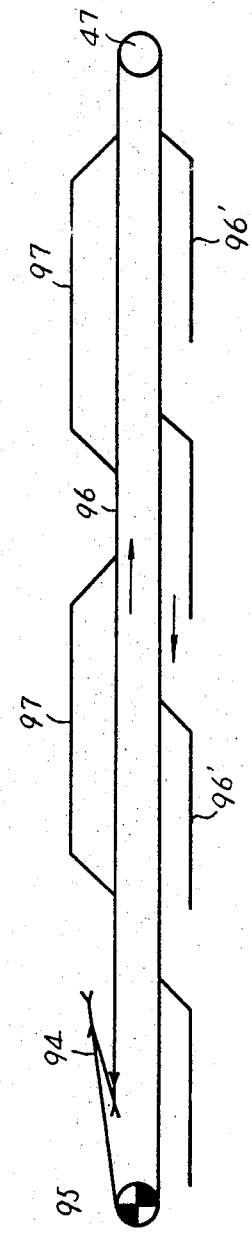

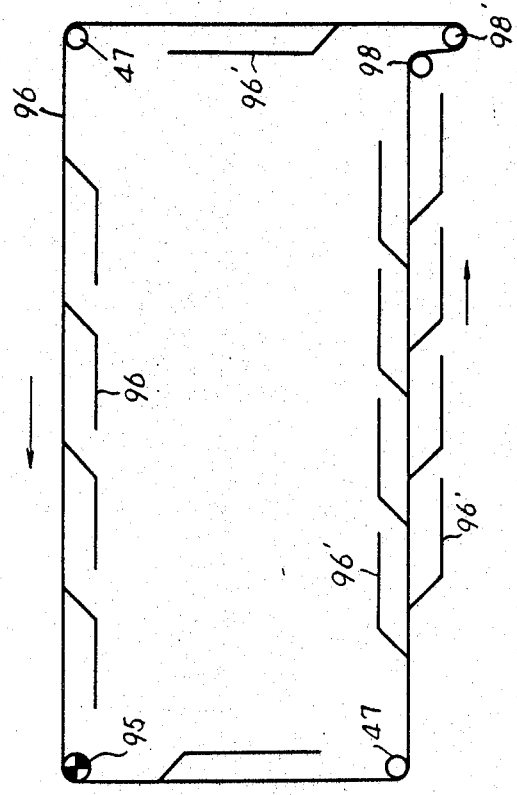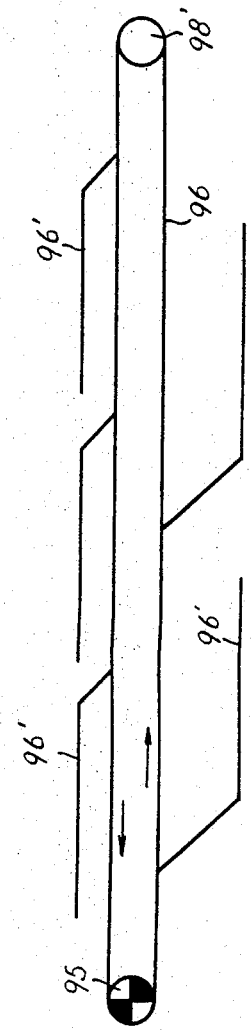

United States Patent Office 3,521,568
Patented July 21, 1970

3,521,568
CABLE TOW CONVEYOR
Takeo Kato, Tokyo, and Toshiyuki Takahashi, Yokohama-shi, Japan, assignors to Sanki Engineering Co., Ltd., Tokyo, Japan
Filed Aug. 22, 1967, Ser. No. 662,522
Int. Cl. B61b 9/00; E01b 25/14
U.S. Cl. 104—172    2 Claims

ABSTRACT OF THE DISCLOSURE

The present carrier tow system has a driven cable carrying lugs in a channel shaped guide rail embedded in a supporting surface on which moves carriers each having a slidable tow pin thereon for engaging one of said lugs whereby said carriers are moved and include pits in said supporting surface each having a driven wheel with catches for mating with said cable lugs to drive said cable and means for guiding said tow pins, at times, into a diverging guide opening from said guide rail.

---

This invention relates to a tow conveyor and has particular reference to a heavy duty tow conveyor of the type driven along a cable wire track movably accommodated in a guide rail of a channel form extending underneath the floor of an installation.

There are known chain trolley tow conveyors which usually utilize as a hauling medium a chain which travels in and along a guide rail of channel steel embedded in the floor and which is provided with a pusher dog positioned in mating relation with the tow pin attached to the bottom of the carriage. Such prior art conveyor system permits of three-dimensional as well as uniplanar haulage of items and, what is more important, renders it quite easy to connect and disconnect chain and carriage.

It is inevittable in this type of conveyors to incorporate an unproportionately large number of component parts, requiring considerable cost in the installation and maintenance thereof. It further involves an excess amount of elongation in the component parts that are susceptible to abrasion, and objectionable noise occurs throughout the operation. The pulley system, where employed, in the drive unit of the conventional conveyor requires per se a relatively large curvature, while the endless chain system necessarily uses expensive equipment and parts. Other drawbacks of such conveyors include the complicated mechanism of the turnover section and the switching and joining devices. The turnover section is constructed by a guide rail of specially curved or bent channel steel and includes a turn roller provided with a considerable number of guide rollers.

Whereas in the conveyor system according to the invention a hauling cable with different lugs arranged at predetermined intervals runs through a track of a guide rail of channel steel embedded in the floor. The propelling means for the carriage or truck i.e. the pusher lug having formed at its top portion a bearing engaging with the tow pin of the truck thereby eliminating the above-mentioned drawbacks of the conventional chain trolley type tow conveyor.

The guide rail for the conveyor system according to the invention is formed by channel steel of simple shape since it suffices to accommodate slidably a line of cable having a series of lugs. This makes a sharp contrast to the conventional chain trolley type tow conveyor in which the guide rail must be assembled with different components so as to dependably receive and allow the rollers fitted to the chain to smoothly slide therein. It will be noted that the switching and branch entry of the cable line used in the embodiment of the invention are greatly facilitated by the specially designed shape of the pusher lug which has the top portion inclined down the front and rear of the lug body at angles most pertinent for the engagement and disengagement of the tow pin and the pusher lug.

Employment of a cable in lieu of a chain as a hauling medium offers a host of advantages, among which are:

(a) Reduced number of component parts;

(b) No need for sprocket wheels to suspend trolleys from an overhead structure or pusher dogs to suspend a chain;

(c) Decreased sectional area of the pit in the floor, which is approximately one-fifth as compared to the chain trolley type conveyors;

(d) Simple structure and performance of the switching and branch entry mechanisms;

(e) Easy connection of cable ends by the use of a splicing or joint lug comprising five components simply through the manipulation of a single pin to which is not exerted the tension of the cable while in operation;

(f) Smooth switching and joining operation due to the special structure of the pusher lug which has a top portion inclined down the front and rear of the lug body;

(g) Noiseless movement of the cable;

(h) Compact structure of the take-up device which is accommodated within the cavity of the pit constituting a portion of the drive or switching mechanisms, with the result that the device need not be moved together with the traveling rail and accordingly that the rail can be laid with no seam occurring therein;

(i) Simply shaped steel materials applicable to form the rail, which has provided therein a slide strip to facilitate the sliding movement of the lugs and prevent the rail from abrasion;

(j) No need for curved steel rails at the turnover section, where straight rails are positioned spaced suitably apart from each other and at a desired angle, with a turnover wheel mounted in between the rails;

(k) Drive mechanism in the sprocket wheel system in lieu of the endless system so as to offer relatively small curvature of the wheel.

Thus, the conveyor according to the invention is designed to offer great economy of production, installation and maintenance, swift but noiseless travel of the cable wire, and easy handling of items to be transported, all of which comes from the utilization of a cable wire as a hauling medium.

These and other objects and novel features of the present invention will be more clearly and fully set forth in the specification and claims.

In the drawings forming a part of the specification:

FIG. 1 is a schematic side view of the carriage and the cable tow conveyor embodying the invention;

FIGS. 3 and 4 are a transverse view and a longitudinal view, respectively, of the cable tow conveyor according to the invention;

FIGS. 17 to 19 are a longitudinal sectional view, a front end view and a top plan view, respectively, of the drive mechanism of the sprocket wheel system implementing the present invention;

FIGS. 25 and 26 are a top plan view and a side view, respectively, of the switching means for the cable used in the conveyor system of the invention;

FIGS. 30 to 33 are schematic views of examples of the circuitous routes having a plurality of sublines;

FIGS. 36 and 27 are a side view and a partially cutaway plan view, respectively, of a modification of the intermediate lug shown in FIGS. 34 and 35;

Figure 2:
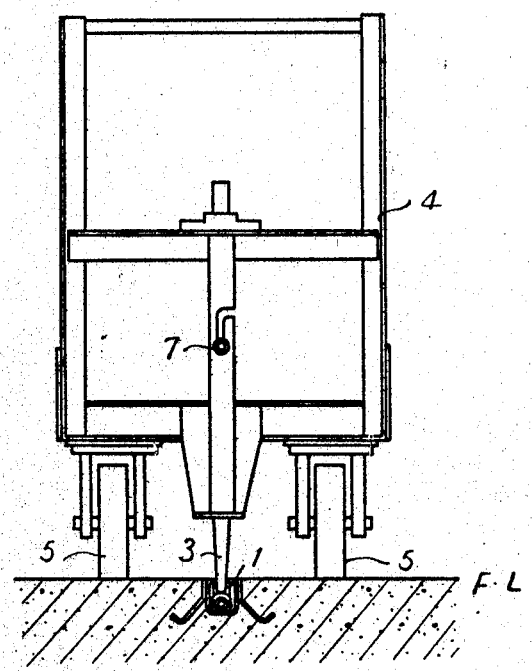
FIG. 2 is a front end view of the carriage of FIG. 1 with the conveyor shown in cross section.

Referring now to the drawings, FIGS. 1 and 2 illustrate a cable tow conveyor system according to the invention which is in the act of operation. A guide rail 1 of channel steel is embedded in the floor and has inserted therethrough a cable 2 having a series of different lugs at predetermined intervals. The cable 2 is connected by a tow pin 3 to a carrier 4 so that when the cable is pulled by a suitable drive means (not shown) the carrier 4 travels along the guide rail 1. A pair of moving casters 5 and a pair of stationary casters 6 are provided underneath the carrier 4, as is the case with the usual conveyors of the type embedded in the floor. Said tow pin 3 has a grip 7 and is attached vertically and centrally of the front of the carrier 4.

The cable 2 runs in and through the rail 1 which can be laid along any desired route, both ends of the cable wire being connected with each other at and by one or more joint lugs 8 to form an endless circuit of the cable 2. A suitable number of pusher lugs 9 and intermediate lugs 10 are furnished along the cable 2 at such intervals as are corresponding to the distances between the catches or retaining means provided in the driving, switching, joining and turnover wheels incorporated in the system as described later.

Figure 3:
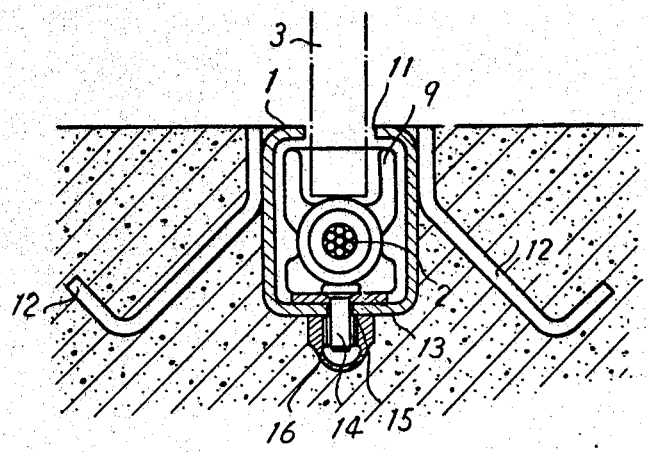

The guide rail 1, as shown in FIGS. 3 and 4 on an enlarged scale, has a substantial U-shaped section with its top edge portion bent inwardly and horizontally to form an opening to be used as a guide 11 for the tow pin 3. The guide rail 1 is embedded in the floor in such a manner that the upper surface of its horizontal edge portions is made flush with the floor surface. To secure the rail 1 in place, anchors 12 are provided adjacent to and support the outside walls of the rail 1. The guide rail 1, furthermore, has on the upper surface of its bottom a relatively thin slide strip 13 for receiving thereon said lugs in a slidable fashion. This slide strip 13 is fixedly laid at the bottom of the rail 1 by means of pins 14 extending downwardly from the slide strip 13 and dropping into holes 15 which are provided in the rail bottom. Said holes 15 communicate downwardly with box nuts or dust-proof covers 16 for the purpose of inhibiting the ingress of dust and mortar into the rail interior while in the mounting of the slide strip 13 and for the purpose of guarding the associated parts against rust damage.

Figure 5:
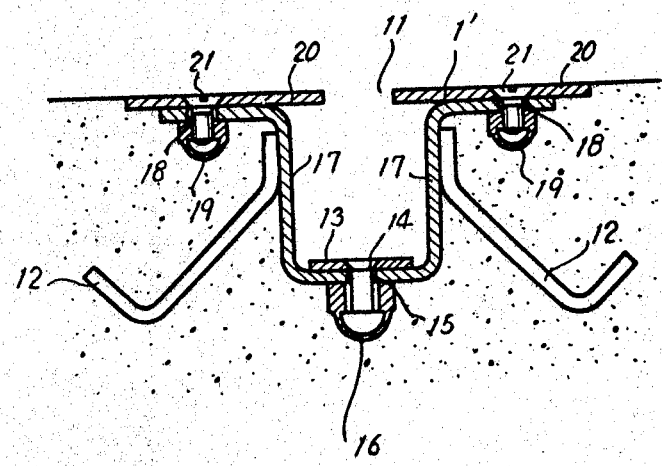
FIG. 5 is a view illustrating a modification of the cable tow conveyor of FIG. 3, wherein the guide rail is of a modified form of channel steel.

FIG. 5 illustrates a modification of the guide rail according to the invention, wherein top edge portions of a U-shaped steel channel are bent outwardly and horizontally to form wings 17 in which are provided holes 18 and box nuts 19 and to which are attached side strips 20 by screws 21, thereby forming a guide 11 between said wings 17 for properly piloting the travel of the tow pin 3. The slide strip 13 may otherwise be welded to the rail bottom at spots spaced from each other.

Figure 6:
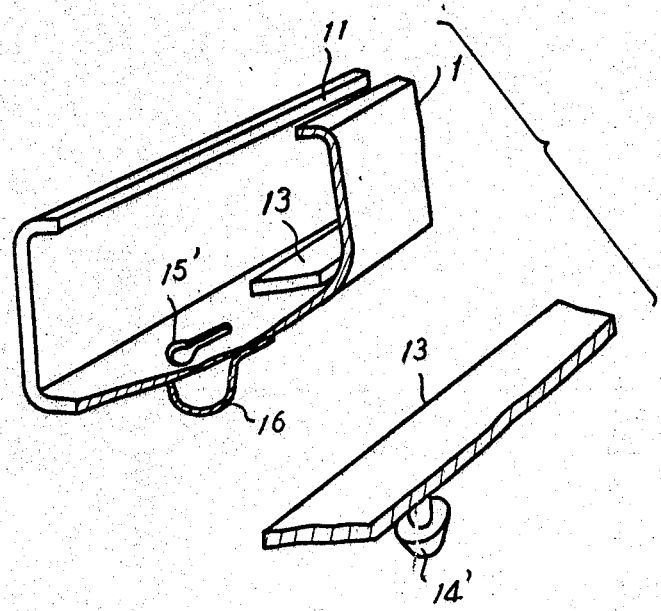
FIG. 6 shows a modification of the slide strip attached to the bottom of the rail interior.

A modified method for mounting the slide strip on the rail bottom is shown in FIG. 6. In the bottom of the rail as illustrated in the figure, there is provided a hole 15' that is contoured like a key-hole, under which is provided a box nut or rounded dust-proof cover 16'. The slide strip 13 has provided underneath thereof a projection 14' having an enlarged cone head. The result of such arrangements is that by inserting the projection 14' into the hole 15' and pulling the slide strip 13 rightwardly of the illustration of FIG. 6, the slide strip 13 is securely attached to the bottom of the guide rail 1. Also, it is quite easy to detach the slide strip 13 from the guide rail.

It will be appreciated that according to the invention the number of component parts is remarkably decreased as compared with the counterparts of existing conveyors of similar function, since the essential parts used to construct the conveyor system of the invention merely consists of a guide rail and a cable having a plurality of joint lugs, pusher lugs and intermediate lugs. Moreover, the sectional area of the guide rail can be minimized by the invention which requires only a simply constructed rail interior that will allow for the passing of the individual lugs.

Figure 7:
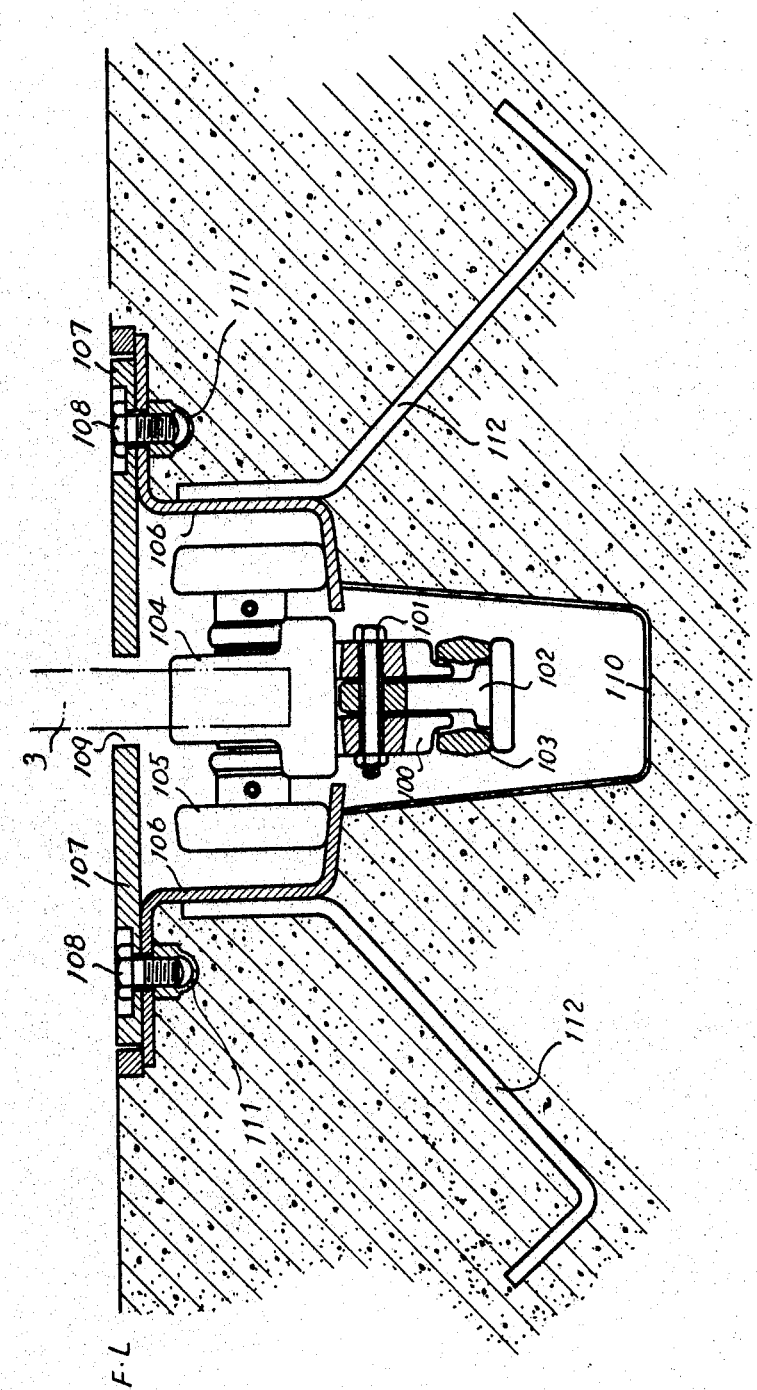
FIG. 7 is a cross sectional view of an example of the prior art tow conveyor of a chain trolley type, which is shown simply for observing the drawbacks inherent in the conventional tow conveyors.

Turning now to the existing conveyors of the type illustrated in detail by FIG. 7, a bracket 102 is hung under a trolley assembly 100 through a pin 101, said bracket being provided with an inner link 103 which constitutes part of the drive chain. The trolley assembly 100 has a pusher dog 104 and a pair of rollers 105, thus comprising a chain trolley. A rail 106 may be formed by a steel channel, a modified steel angle or the illustrated Z-shaped rail. A plate 107 is fastened to the horizontal top edge of the rail 106 by the use of a bolt 108 and a box unit 111 thereby to form a guide clearance 109. Anchors 112 are attached by welding to the outside walls of rail 106, extending downwardly at a certain angle. A casing 110 is adapted for the protection of the chain and is positioned under the rail assembly 106.

In this type of tow conveyor system using a chain trolley, the number of the component parts amounts to 155, whereas the conveyor according to the invention incorporates as few as 33 parts, or, by dimensions, it requires one-third of the sectional area of the pit in the floor. It may therefore be noted that the tow conveyors of chain trolley type have so many component parts that the chains are liable for elongation when the abrasion of the associated parts builds up. The travel speed of the conveyor of the prior art is, as a result of the deterioration of the chains, normally 30 to 40 m./min. One of the important objects of the instant invention is, therefore, to afford faster travel of the conveyor, say, about 60 m./min. irrespective of the possible occurrence elongation of the component parts.

Figure 8:
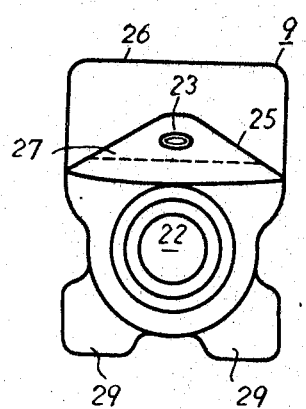
FIGS. 8 to 11 are a front end view, a longitudinal side sectional view, a top plan view and a rear end view, respectively, of the pusher lug on an enlarged scale.
Figure 9:
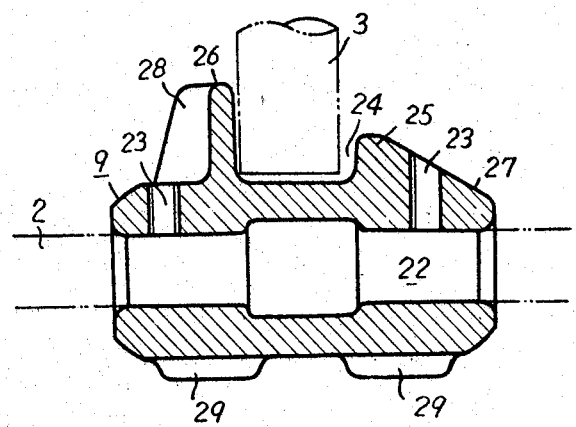
Figure 10:
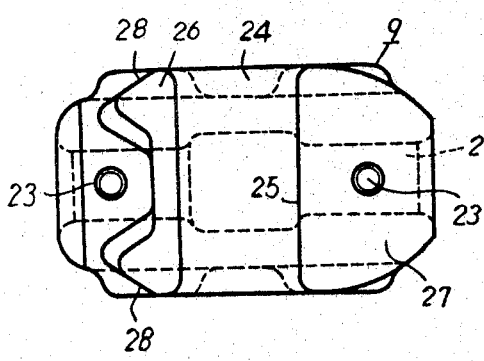
Figure 11:
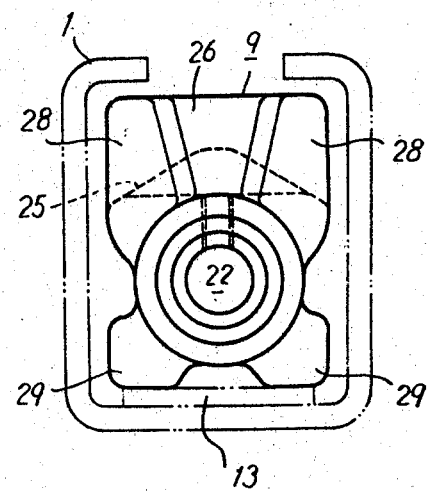

Shown by FIGS. 8 to 11 is the pusher lug 9 on an elongated enlarged scale, which has, provided at its substantial central portion, a hole 22 used for the insertion of the cable 2. Designated at 23 is internal threads for receiving a bolt. A bearing 24 is formed on the top of the lug 9 so as to carry the pen 3, and projections 25 and 26 are provided at the front and rear, respectively, of the top portion of the lug 9. The projection 25 is adapted for holding the carrier 4 against accidental movement while the latter is held at rest, and the projection 26 is supporting the tow pin 3 and thereby propelling the truck 4. Said projection 25 inclines down the front of the lug as best shown in FIG. 9 and down both sides of the lug as best illustrated in FIG. 8, thus forming an inclined surface 27. The longitudinal inclination of the projection 25 serves to smoothly bring the tow pin 3 into abutting engagement with the bearing 24, which is done by sliding the two pin 3 up the inclined surface of the projection. The transverse inclination lends itself to the smooth sliding of the tow pin 3 while the conveyor enters or departs through a sub-line as described later with more details.

The projection 26 also inclines down the rear of the pusher lug 9 so that when the tow pin 3 approaches the lug from the right or the left and nevertheless fails to catch it in line during the switching and joining operation of the conveyor, the tow pin 3 slides backward and stands by for the next coming pusher lug.

At the bottom of the pusher lug 9 there are furnished four legs 29 to enable the lug 9 to run smoothly on the slide strip 13 laid in the rail 1. It is to be noted that the pusher lug, which particularly is intended for carrying and propelling the tow pin 3, is subjected to greater frictional resistance against the slide strip than the joint lugs and intermediate lugs. This is why said four legs 29 are provided at the bottom of the pusher lug 9, and not with the rest of the lugs.

Figure 12:
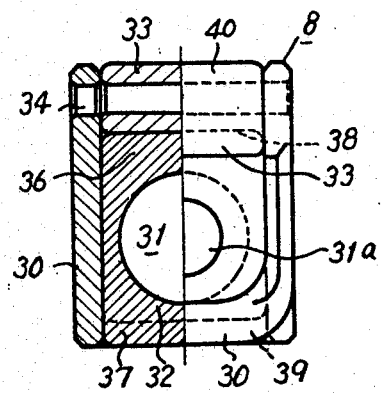
FIGS. 12 to 14 are a partially sectional front end view, a top plan view and a longitudinal sectional view, respectively, of the joint lug.
Figure 13:
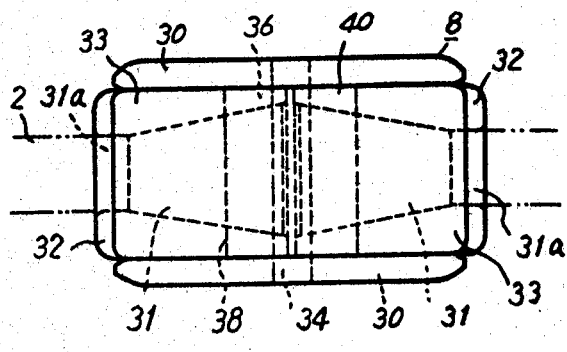
Figure 14:
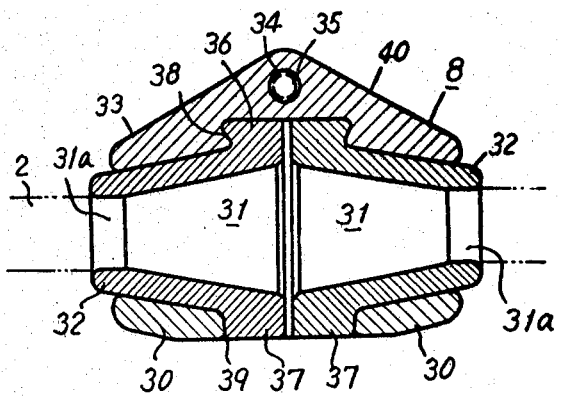

The joint lug 8 is shown by FIGS. 12 to 14 on an enlarged scale. The joint lug assembly 8 as illustrated comprises a socket frame 30 incorporating therein a pair of sockets 32 having a tapered hole and abutting end-to-end with each other and a cover 33 having centrally a hole 34 running transversely of the lug body to permit of the insertion a spring pin to fasten the cover 33 to the socket frame 30.

Each socket 32 has at its outer peripheral portion of larger diameter an upper projection 36 and a lower projection 37 as shown in FIG. 14, and correspondingly there is provided a recess 38 in the cover 33 and a hole 39 in the bottom of the socket frame 30. Both the width of the recess 38 and the diameter of the hole 39 are substantially larger than the corresponding projections 36 and 37 for the purpose of easy assembly and disassembly of the joint lug 8. The cover 33 has centrally a top portion wherefrom the upper surface of the cover inclines in opposite directions, namely, down the front and the rear of the joint lug.

It may suffice to use only one joint lug for one cable line to connect both ends of the cable wire to form an endless circuit. For the purpose of connecting the cable in an end-to-end fashion, it is necessary to insert an end portion of the cable into one of the tapered holes 31 of the socket 32, pour thereinto a suitable amount of fused metallic material to secure the cable in place, place the projection 37 of the socket 32 in close engagement with the hole 39 of the frame 30, lay the cover 33 on the upper half of the socket 32 and insert the pin 35 into the hole 34. The cable 2 is thus retained firm in the hole 31 of the socket and, if pulled powerfully, is kept tight by the aid of the projections 36 and 37 of the socket, the recess 38 of the cover 33 and the hole 39 of the frame structure. If the tow pin 3 happens to hit the joint lug while the cable is travelling, it slides down the inclination 40 of the cover backwardly, thus prohibiting objectionable shock and stress occurring upon the tow pin 7. Designated at 31a in the drawing is a flat portion formed at the end portion of smaller diameter of the tapered hole 31 so as to facilitate the exposed area of the cable to abut against the socket 32, thus protecting the cable tip from abrasion.

Now, there follows the description of the mechanisms most pertinent to operate the cable tow conveyor system according to the present invention.

Figure 15:
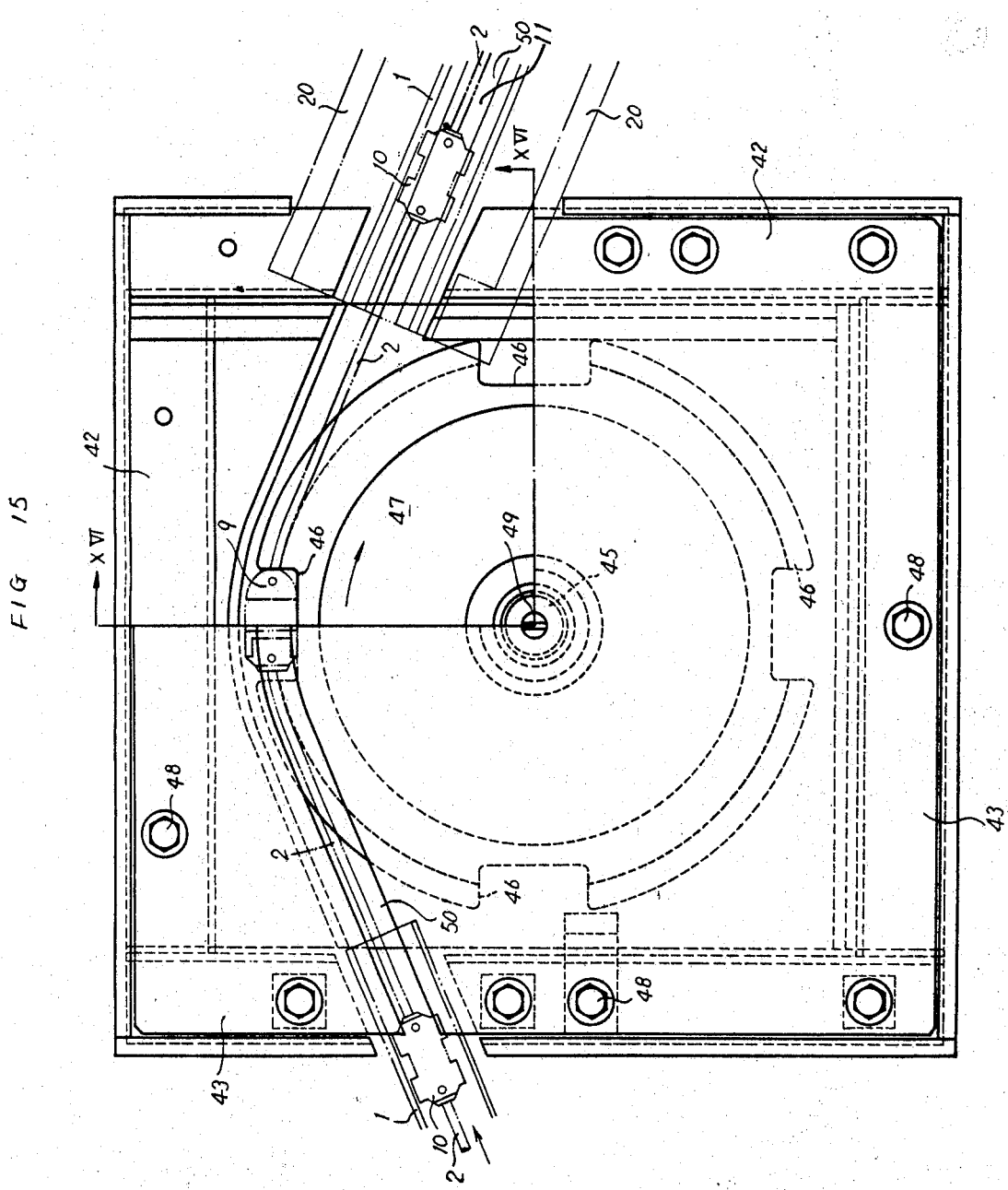
FIGS. 15 and 16 are a top plan view and a longitudinal sectional view, respectively, of the device adapted for changing the direction of the cable movement at an angle of approximately 45 degrees.
Figure 16:
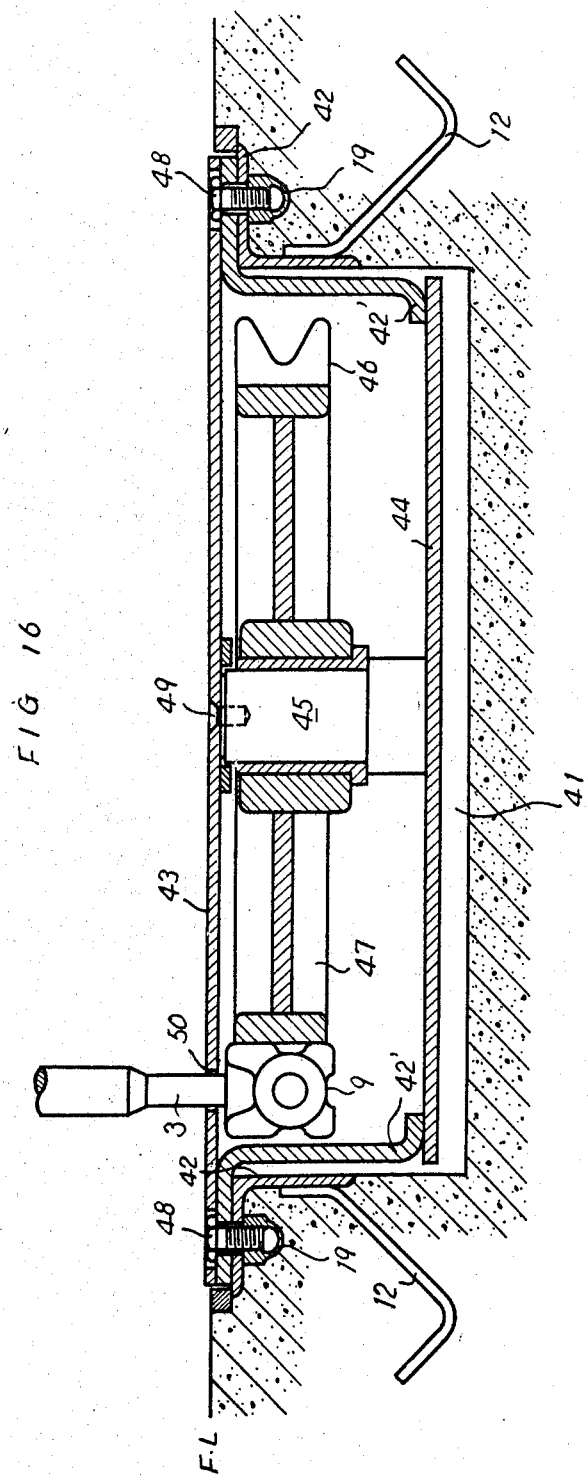

FIGS. 15 and 16 illustrates a turnover device of the conveyor which is adapted for changing the direction of the cable travel in the course of operation.

At the point where the guide rail is to make a turn, the floor is dug out to form a shallow pit 41 in which is embedded a framework 42 carrying thereon a top plate 43 and a base plate 44. Outside and adjacent the framework 42 in the floor are provided a pair of anchors 12 to secure said framework in position. The incoming and outgoing rails are attached tangentially to the wheel 47. The illustrated rails are arranged in such a manner that they make an angle of approximately 45 degrees with respect to each other.

The wheel 47 has formed on its periphery a V-channel to snugly receive the cable 2 and a plurality of recessed catches for engagement with the individual lugs. This wheel 47 is supported by a shaft 45 fixed intermediate the top and base plates at the substantial middle portion of the pit 41. Designated at 48 is a bolt used to fasten the plate 43 to the framework 42, and at 49 a screw serving to tighten the plate at the central portion of the shaft 45 so as to prohibit the plate from floating off the framework 42. In a portion of the plate 43 which is located immediately above the working part of the wheel 47, there is a curved clearance 50 formed concentrically with the wheel as illustrated in FIG. 15.

With the cable 2 applied to the turnover device, each of the lugs 8, 9 and 10 are transferred from one rail to the other, guided by and meshing with the recessed catches 46. During the turnover movement of the conveyor, the tow pin 3 engages with the pusher lug 9, enters the curved clearance 50 by way of the guide 11 from one side of the rail 1, travels along the curved route of the clearance with the direction of the travel progressively varied and is then transferred to the opposite guide 11, thus completing the change of the direcion of the travel with no interruption of the movement involved.

The turnover device used in the conventional tow conveyors of chain trolley type requires an unproportionately complicated structure with necessity for bending the rail guide proper and for using a considerable number of turn rollers and a relatively large sized turn wheel. This invention, however, provides a compact and simplified structure of the turnover device in which it suffices to arrange straight rails in the vicinity of the turn wheel. Another advantage of the present invention is that the pit for accommodating the turnover device can be provided at any desired location and with utmost ease in construction work. This eliminates the difficulties that have usually been inevitable in the design of tow conveyors, therefore offering low cost of installation and maintenance.

Figure 17:
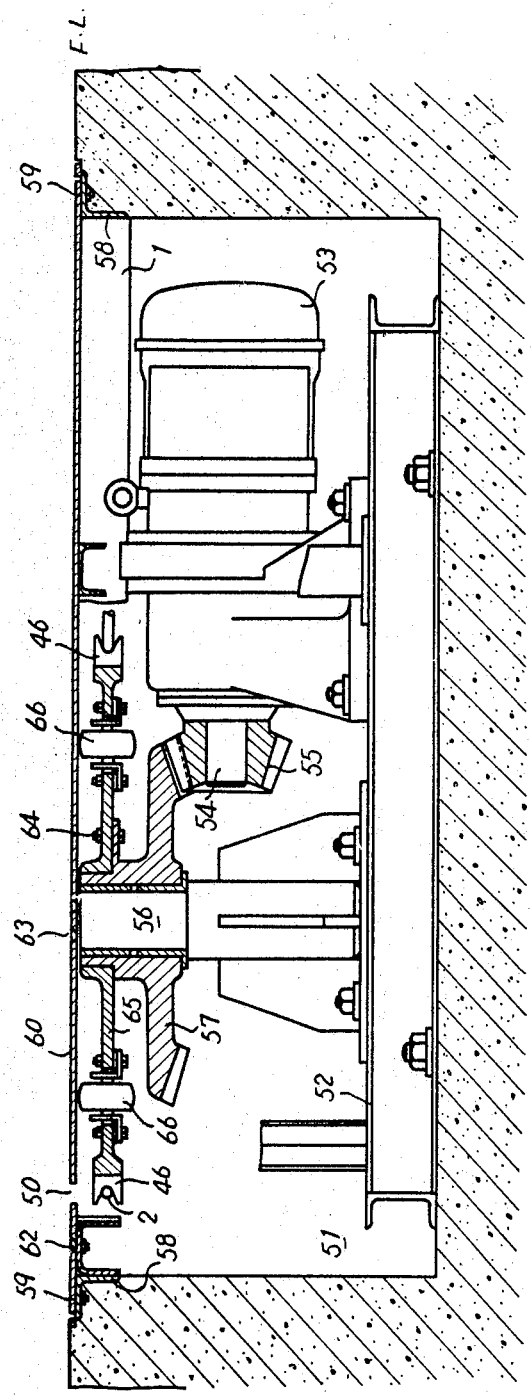
Figure 18:
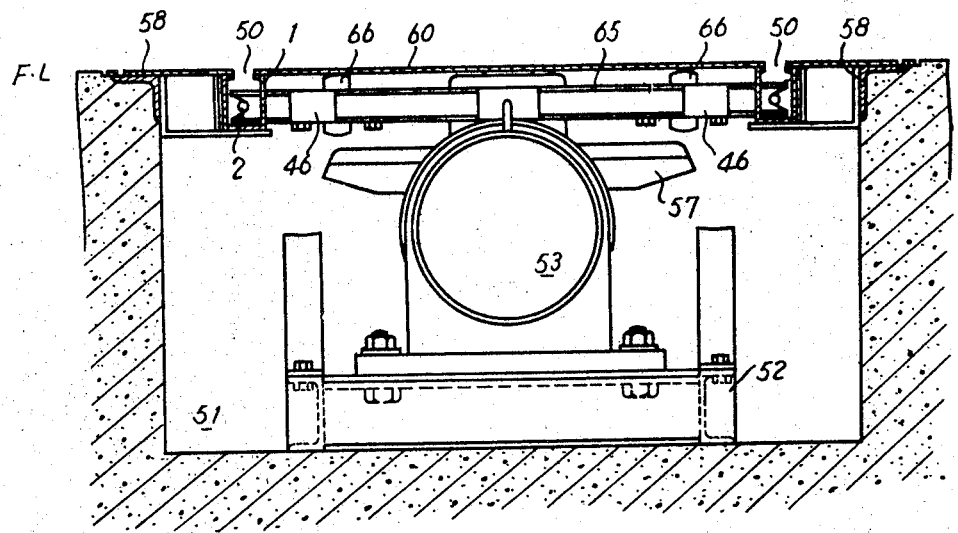

FIGS. 17 to 19 illustrate the drive mechanism of the conveyor system according to the invention.

A pit 51 embedded in the floor is furnished therein with a framework 52 for the accommodation of a speed reduction motor 53 of which shaft 54 is connected to a minor bevel gear 55 which is further meshed with a major bevel gear 57. At the upper periphery of the pit 51 is furnished a framework 58 above which is secured a pit cover 60 by a bolt 59.

Bearings 61 are provided at the upper portion of the framework 58 to carry the cover 60 at its strategic spots by means of bolt 62. The pit cover is further supported at its central portion by a pin 63 at the top of the drive shaft wheel 56.

The major bevel gear 57 is mated at its top portion with a drive wheel 65 through a sheer pin 64, this wheel having at its periphery the lug catches 46 similar to the turn wheel. There are provided on the upper surface of the drive wheel 65 a suitable number of rollers which centrally carry the pit cover while the rollers are turning on the lower surface of the pit cover.

Two different guide rails are installed within the cavity of the pit 51 in a tangential direction with respect to the drive wheel 65, and along the extension of the guide 11 formed by the rail is provided a clearance 50. It follows that the pit cover 60 is divided into two different areas defined by the clearance 50 formed along the circumference of the wheel 65 and along the extension of the guide 11 of the rail 1. The pit cover 60 is supported at the outer edges by the frame 58 and the bearings 61, and at the inner part by a portion of the pit frame 58, a portion of the bearing 61, the rollers 66 of the wheel and the top of the wheel shaft 56. Such arrangements of the pit assembly permit the operator to walk around on the pit cover while the carrier is not passing by or in down-time period.

When the wheel 65 is driven through the bevel gears 55 and 57 by the motor 53, the individual lugs engage with the catches 46 so as to pull the cable which accordingly turns in the direction of the arrow as shown in FIG. 19. The tow pin 3 meshed with the pusher lug 9 of the cable 2 advances and varies its direction of movement substantially 180 degrees, guided by the clearance 50.

Figure 20:
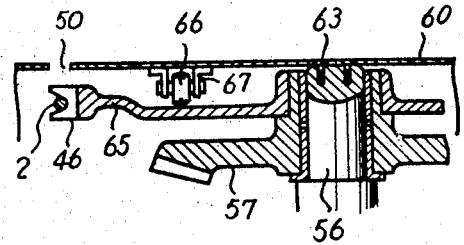
FIGS. 20 and 21 are side views illustrating modifications of the rollers used in the drive mechanism of FIGS. 17 to 19.
Figure 21:
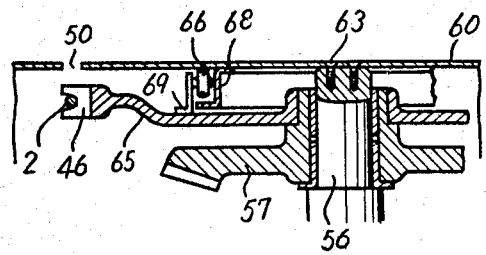

Modifications of the roller assembly of the drive mechanisms are illustrated by FIGS. 20 and 21. FIG. 20 particularly shows a roller 66 which is pivotally attached to arms 67 on the back of the pit cover 60, which roller is held in abutting relation with the wheel 65 so as to turn as the wheel does. FIG. 21 further shows a roller 66 pivotally attached to an arm 63 projecting from the wheel 65 in correspondence with an engagement ring 68 which is substantially L-shaped in section and which is provided on the back of the pit cover 60, said roller and ring being engaged with each other. The roller of FIG. 20 serves to carry that pit cover 60 in a similar manner to the rollers shown by FIGS. 17 to 19, while the roller of FIG. 21 is intended to prohibit the pit cover from warping.

It may be appreciated that the drive mechanism of the conveyor according to the present invention offers economy of construction, minimum loss of power transmission and simplified structure, all of which are the result of the ingenious sprocket wheel system of relatively small curvature, while the tow conveyors of known type are usually driven by an endless system which requires costly construction. Furthermore, it is to be noted that the arrangements of the pit cover which is firmly supported by the roller affords additional floor space in the factory where the conveyor system according to the invention is installed.

Another feature of the tow conveyor according to the present invention resides in the utilization of a vertical take-up device adapted to properly maintain the tension of the cable, which is not applicable to the tow conveyors of chain trolley type. It is, however, to be noted that the usual horizontal take-up device can also be used in the tow conveyors of this invention, if desired.

Figure 22:
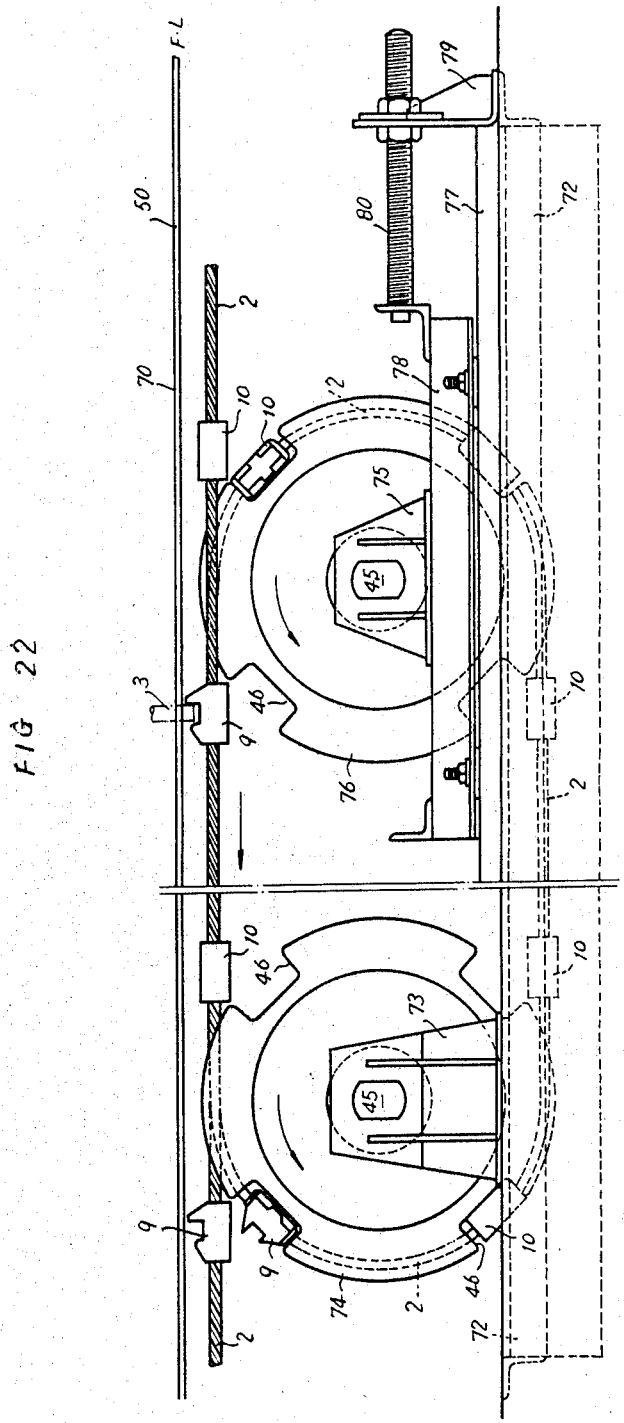
FIGS. 22 to 24 are a side view, a top plan view and a cross sectional view, respectively, of the vertical take-up device according to the invention.
Figure 23:
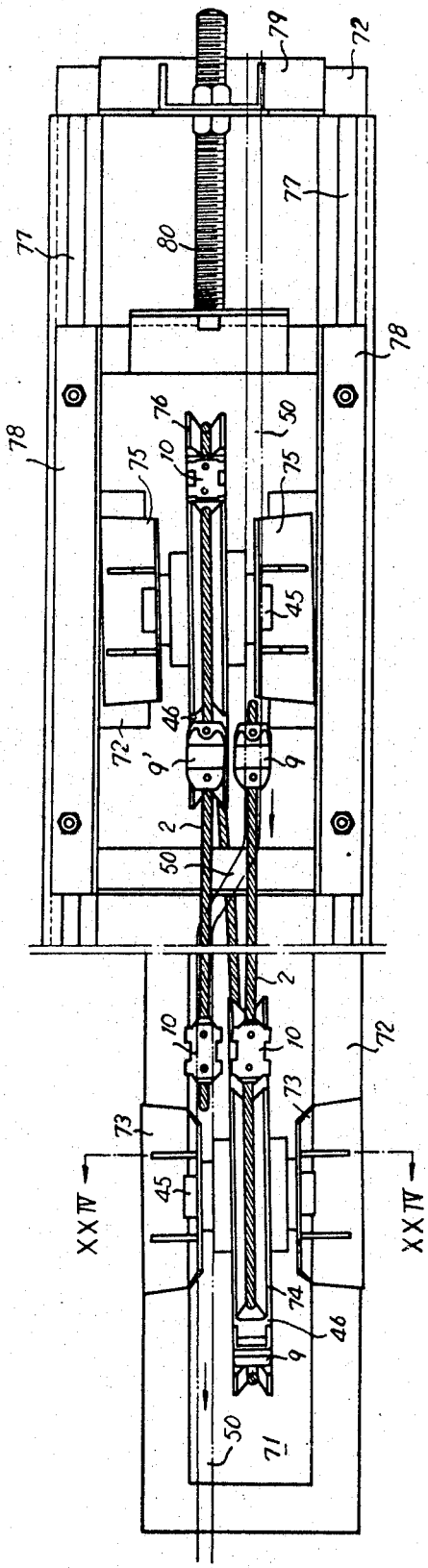
Figure 24:
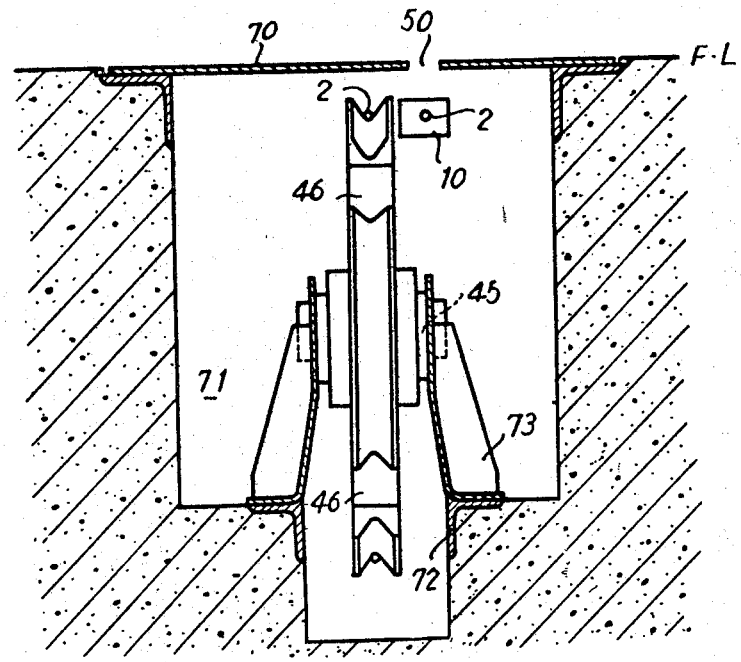

Shown in FIGS. 22 to 24 is a modification of the vertical take-up device according to the invention. Framework 72 is embedded in a pit 71 and a stationary wheel 74 is pivotally attached to a bracket 73 at one side of the frame and a take-up wheel 76 to a bracket at the other.

The bracket 75 is secured to the take-up carrier 78 mounted on the guide rail 77 on the framework 72. The take-up carrier 78 is properly positioned by a take-up bolt 80 extending from the bracket 79. Each stationary wheel 74 and take-up wheel 76 has at its entire periphery a V-shaped channel for reception of the cable 2 and a plurality of catches or retaining means to mesh with the individual lugs, similar to the turn wheel. These wheels 74 and 76 are spaced substantially broader than the width of the individual lugs as best shown in FIG. 23 for reasons explained later. The cable 2, which is illustrated as advancing from right to left of the drawing, turns around the stationary wheel 74, departs therefrom at the lowermost position, reaches the take-up wheel 76 at the lowermost position, makes a further turn about the take-up wheel and departs therefrom at the uppermost position, thus completely restoring the linear movement. There is provided in the pit cover a curved clearance 50 linking the incoming and outgoing carrier trucks so as to guide the tow pin 3 therealong.

The behaviour of the tow pin 3 as being guided along the clearance 50 will be understood from the illustration of FIG. 23.

Suppose the tow pin 3 engaged with the pusher lug 9 has now approached the curved clearance 50 which is illustrated at the substantial middle part of the figure, the counterpart pusher lug 9' is, at this time point located parallel to the incoming pusher lug 9, with the result that the two pusher lugs 9 and 9' advance at the same speed and in the same direction. As soon as the tow pin 3 enters the curved portion of the clearance 50, the tow pin is slidingly transferred from the pusher lug 9 to the opposite pusher lug 9', then advancing in the direction of arrow shown in the figure. It will be understood that this transition of the tow pin is greatly facilitated by the provision of the inclined surface 27 at the front of the pusher lug and by the provision of the flat bearing portion at the top, as already explained with reference to FIGS. 8 to 11.

The position of the take-up wheel 76 can be regulated by the use of the threaded rod 89 thereby to maintain the tension of the cable at a proper strength over an extended period of operation.

It will be appreciated that the take-up device according to the invention makes best use of the tow conveyor using a cable as a hauling medium through the utilization of the vertical take-up system, thus providing a relatively small curvature of the take-up wheel to minimize the sectional area of the pit and making adjustable the tension of the cable. On top of this, the shift of the tow pin from one lug to another at the turnover section of the cable road is greatly facilitated according to the invention, which, however, has been considered extremely difficult to carry out in the take-up device of vertical type.

To provide sublines or turnouts in the circuit of the cable road, it is necessary to furnish a switching and joining means for the cable.

Figure 27:
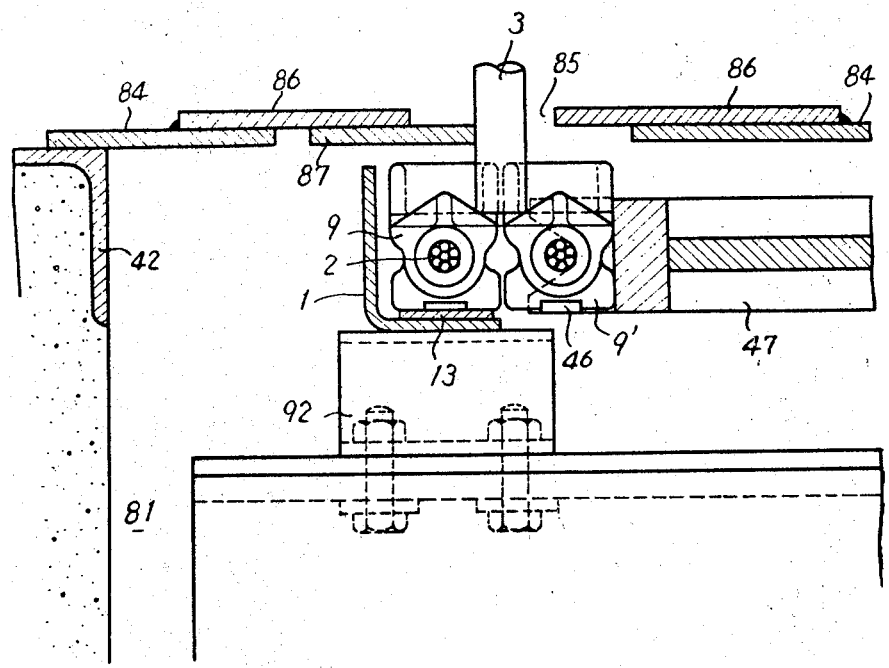
FIG. 27 is a cross sectional view of the switching means of FIG. 25 taken on the line A—A.

Shown in FIGS. 25 to 27 are the switching means embodying the invention, which has a mounting block 82 at the bottom of the pit 81 so as to carry a wheel shaft 83 which further carries the wheel 47.

At the circumference of the pit 81 is provided a framework 42, above which is mounted a pit cover 84 secured by a bolt 48. A Y-shaped clearance 85 is slotted in the pit cover 84 to serve as a guide for the tow pin 3. Immediately below the clearance 85, there are three running rails spaced from each other in different directions. A reinforcing plate 86 is welded to the pit cover at spots where the switching operation takes place. A movable guide plate 87 is attached to the portion defined by an acute angle made by the switching routes so as to shift the clearance 85 in the pit cover 84. Designated at 92 is a rail bracket.

On the mounting block 82 is provided a drive mechanism 88 which operates by means of a cylinder, air-cylinder or electromagnet and which is associated through arms 89 and 90 with a switching shaft 91. This means that the start of the drive mechanism 88 is followed by the rotation of the switching point shaft at a predetermined angle by way of the arms 89 and 90 thereby to initiate in action said guide plate either to the right or to the left.

The main line cable is illustrated in FIG. 25 to run in a straight direction with the subline cables arranged 45 degrees shifted from the main line by means of the wheel 47 and with the tow pin 3 positioned substantially centrally of the switching point. The guide plate 87 is so designed as to shift from the main line to the subline. As a result, if the cables 2 and 2' are transferred in the direction of arrow at the same speed, the tow pin 3 is guided toward the guide plate 87 until it assumes the direction of the guide member 85'. In this instance, as illustrated on an enlarged scale in FIG. 27, the tow pin being transferred in an engagement relation with the pusher lug 9 slides on the bearing portion 24 of the lug and, guided by the guide plate 87, is shifted to the opposite lug 9' running in the subline. It will be apparent that this movement of the tow pin is analogous in function with that taking place at the take-up device.

If desired, it is possible to let the tow pin 3 advance in a straight line by restoring the drive mechanism 88 to the original condition to turn the switching shaft 91 in an opposite direction so as to close the clearance 85 of the guide plate at the branch entry to the subline and keep the main line open, at which the cable 2' in the subline conducts no-load operation.

Figure 29:
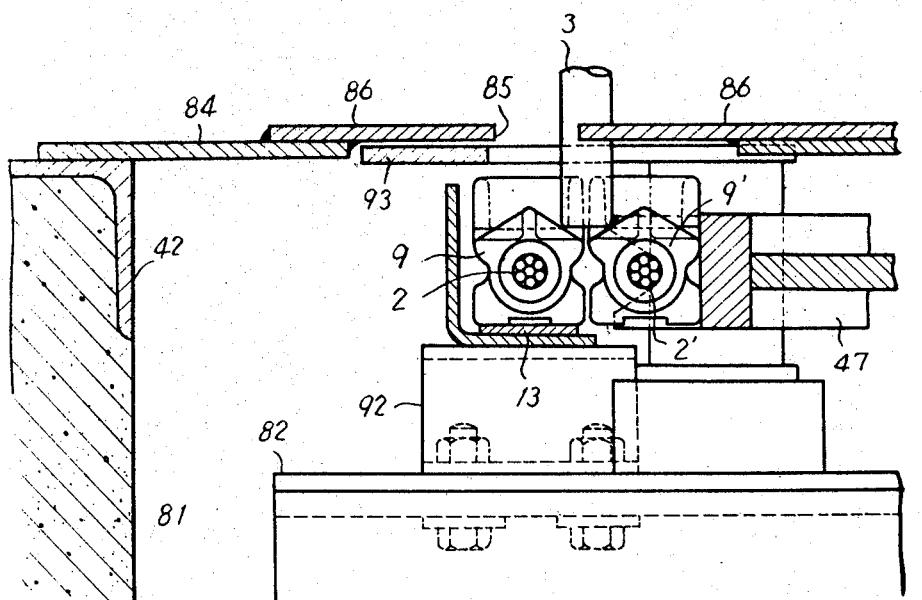
FIG. 29 is a cross sectional view of the means of FIG. 28 taken on the line B—B of FIG. 28.
Figure 28:
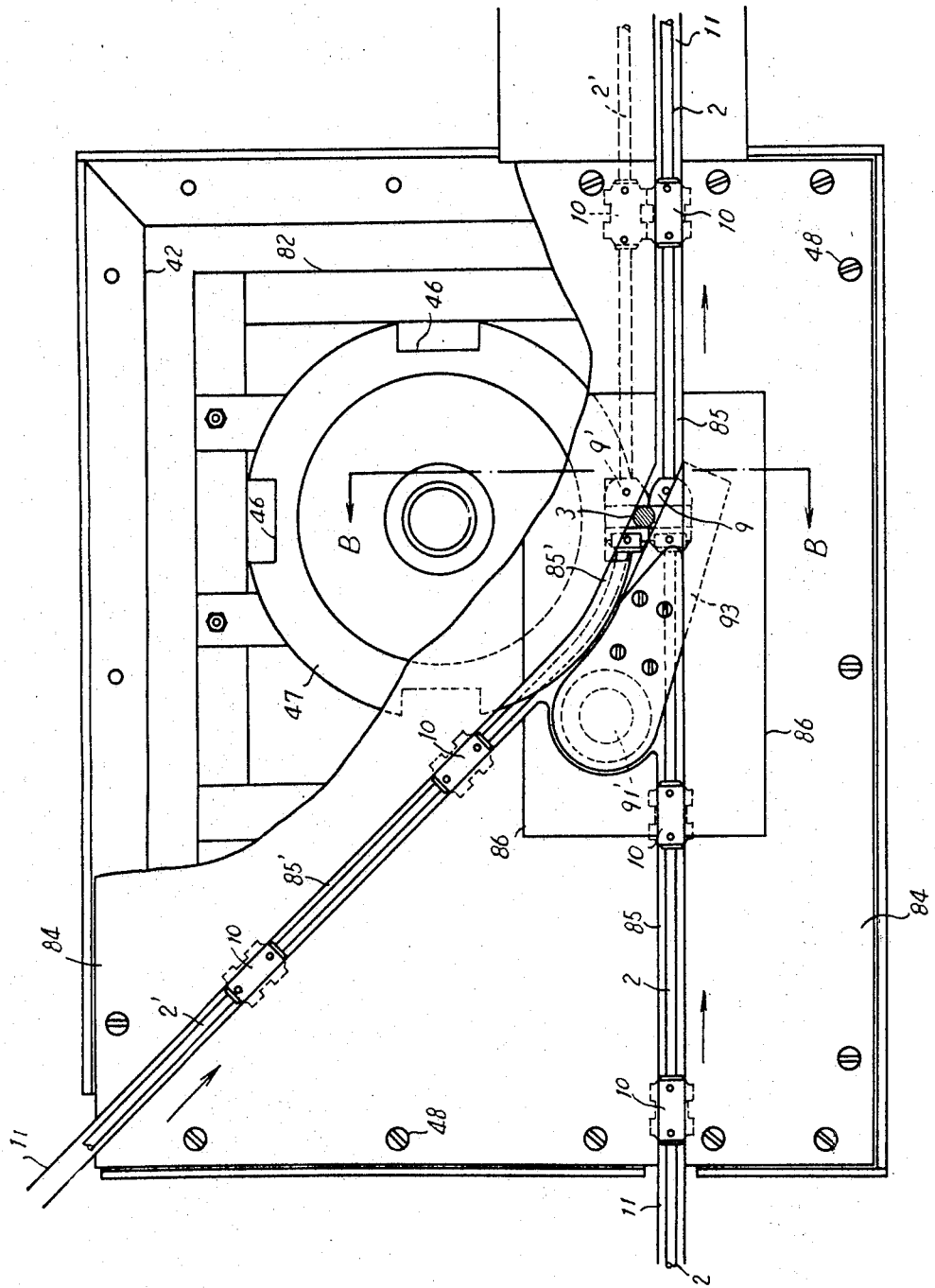
FIG. 28 is a top plan view of the joining means for the cable.

The joining device of the cable line, as shown in FIGS. 28 and 29 is built substantially similar to the switching device except that the guide plate 86 is pivotally mounted at the joining spot and that a drive mechanism connected to a switching shaft is dispensed with. Similar to the tow conveyor system of prior art, the joining device according to the invention is provided with a detector means for preventing two carriers from entering the main line. At the joining point of the cable road, the tow pin 3 is slidingly shifted from the lug 9' travelling in the subline to the opposite lug 9 in the main line, guided by the guide plate 93 pivotally attached to the switching shaft 91', as shown in FIG. 29.

In the known tow conveyors of chain trolley type, it is extremely difficult to transfer a tow pin slidingly from one pusher dog to the other at the same level of the position, necessitating therefore to thrust the tow pin upwardly immediately before the switching or joining point thereby to release it from the pusher dog or to thrust the chain rail downwardly. The result of such arrangement is a complicated mechanism of the switching and joining devices which ultimately leads to frequent operational failures occurring therein. According to the invention, however, the switching and the joining devices are constructed with utmost simplicity, wherein the subline is passed around a turnover wheel positioned close to the main line and a guide plate is provided at the switching and the joining spots of the cable line. This enables the whole device to be accommodated in a relatively small pit in the floor, offering notable economy of installation.

FIGS. 30 to 33 show examples of the cable lines designed for bringing into practice the cable tow conveyor system according to the invention.

The main line of FIG. 30 is made up of a vertical take-up device 94 and two different drive sections 85 and 95, whereupon a plurality of sublines 96' are arranged as illustrated. The chain lines in the figure indicate additional lines to be laid in the future. The drive sections are illustrated to make a turn at right angles, but it is also possible to design the drive sections to make a 180° turn as shown in FIGS. 17 and 19. Designated at 47 is a subordinate or turnover wheel.

FIG. 31 illustrates another example of the cable route which is provided with a vertical take-up device 94, a plurality of sublines 96' and two switching and joining lines 97 and which is driven by a single motor 95.

Shown in FIG. 32 is a further example of the circuit of the cable line having a horizontal take-up device which comprises a stationary wheel 98 and a take-up wheel 98' and which is arranged opposite to the drive section 95, with a plurality of sublines 96' parting from the main line 96.

FIG. 33 illustrates a further example of the circuit of the cable line for use with the cable tow conveyor system according to the invention, wherein a horizontal take-up wheel 98' is provided opposite to the drive section 95, a plurality of sublines 96' parting from the main line 96.

In addition to the illustrated examples, a variety of arrangements of the cable lines will be practicable in view of the simple construction and mechanism of the switching and the joining devices implementing the invention.

Figure 34:
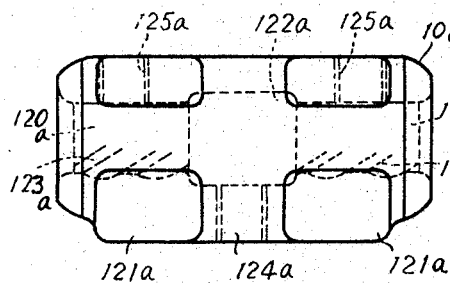
FIGS. 34 and 35 are a side view and a partially cutaway plan view, respectively, of the intermediate lug attached to the conveyor cable.
Figure 35:
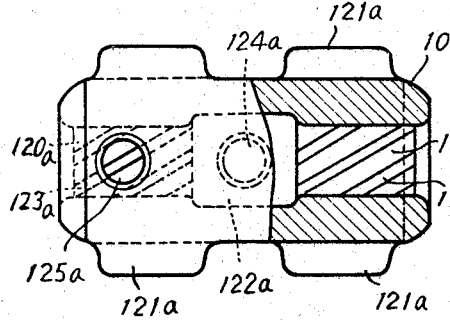

The intermediate lugs used in the cable of the conveyor system according to the invention are of known type, an example of which is shown in FIGS. 34 and 35. The lug 10a is illustrated as having a hole 120a used for the insertion of the cable 2 in a longitudinal direction of the lug body and a projection 121a. The hole 120a has provided at its bottom screw type grooves 123a to fit to the cable tip, the enlarged portion 122a at the central portion of said hole 120a being devoid of such screw type grooves. Internal threads 124a are formed between the bottom of the lug and the enlarged portion 122a so as to securely receive a clamping bolt, while internal threads 125a are provided communicating from the lug top to the hole 124a. With the cable inserted and secured by a clamping bolt into the intermediate lug having the described arrangements, the cable fits snugly to the screw type grooves 123a.

Figure 36:
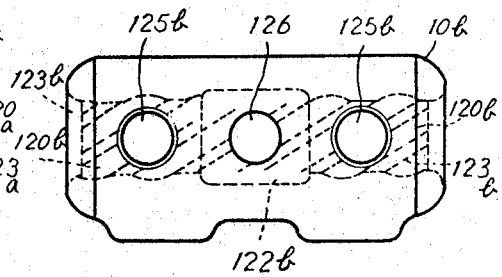
Figure 37:
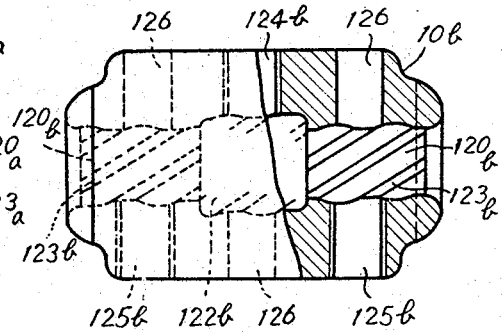

A modification of the intermediate lug is shown in FIGS. 36 and 37. This modified lug 10b is designed to be devoid of the projection shown by the numeral 121a in FIGS. 34 and 35, and in lieu thereof, both sides of the lug body are made flat where internal threads 124b and 125b and groove hole 126 are alternately provided. Screw type grooves 123b are formed in the inside wall including the enlarged portion 122b in the direction of the bolt advance. The lug assembly, being thus arranged the cable fits snugly to the screw type groove 123b, with the cable inserted throughout the hole 126 and with the bolt tightened as gar as it goes. This modified lug will be considered more advantageous than that described with reference to FIGS. 34 and 35 in that the tension of the cable adds to the tightening force thereof to the screw type grooves 123b.

Figure 38:
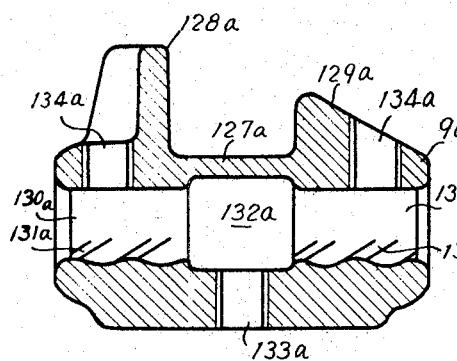
FIG. 38 is a longitudinal sectional view illustrating a modification of the pusher lug shown in FIG. 9.

It is also possible to use a modified form of the pusher lug which is shown in FIG. 38. The illustrated pusher lug has at its top portion a bearing portion 127a, a supporting portion 128a and an inclined surface 129a. Screw type grooves 131a are formed in the central hole 130a, internal threads 133a at the bottom of the central enlarged portion 132a, and two internal threads 134a running from above.

Figure 39:
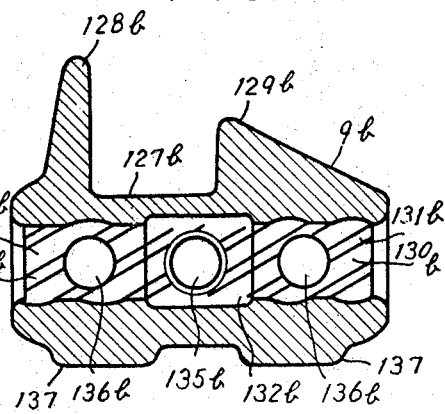
FIG. 39 is similar to FIG. 38 but showing another modification of the pusher lug.

FIG. 39 illustrates another modification of a pusher lug 10b which has provided therein a hole which is similarly designed to the intermediate lug 10b shown in FIGS. 36 and 37. In the inside wall of the hole of the pusher lug 10b are formed screw type grooves 131b and three internal threads 135b alternately running transversely of the lug body, thus assuring an increased clamping of the cable to the pusher lug. Designated at 132b, 136b and 137 are a central enlarged portion, a groove hole and a bottom leg, respectively, of the lug 10b.

It will be apparent that other modifications and variations may be effected without departing from the scope of the invention.

What is claimed is:
1. A carrier tow system comprisng a channel shaped guide rail having a top guide opening and embedded in a supporting surface, a driven cable moveably positioned in and extending lengthwise of said guide rail, a plurality of pusher lugs attached to and spaced apart along the length of said cable, each pusher lug having a flat top bearing portion, bearing a projection at the front of said bearing portion inclined downwardly towards the front of the lug and a second projection at the rear of said bearing portion inclined downwardly towards the rear of the lug, a carrier movably mounted on said supporting surface, a tow pin slidably mounted on said carrier and extending through said guide rail opening for being positioned on said lug bearing portion between said lug projections whereby one of said lug projections pushes said tow pin and thus said carrier, a pit in said supporting surface, a driven wheel in said pit having peripheral catches for mating with said cable lugs to drive said cable, a pit cover, and rollers positioned between said wheel and said pit cover supporting said pit cover on said wheel.

2. A carrier tow system comprising a channel shaped guide rail having a top guide opening and embedded in a supporting surface, a driven cable movably positioned in and extending lengthwise of said guide rail, a plurality of pusher lugs attached to and spaced apart along the length of said cable, each pusher lug having a flat top bearing portion, bearing a projection at the front of said bearing portion inclined downwardly towards the front of the lug and a second projection at the rear of said bearing portion inclined downwardly towards the rear of the lug, a carrier movably mounted on said supporting surface, a tow pin slidably mounted on said carrier and extending through said guide rail opening for being positioned on said lug bearing portion between said lug projection whereby one of said lug projections pushes said tow pin and thus said carrier, a horizontally mounted wheel having peripheral chambers receiving said cable lugs, a cover mounted over said horizontal wheel and having a guide opening for said tow pin in communication with said guide rail and diverging guide opening in communication with said first guide opening, a guide plate pivotally mounted on said cover and positioned for opening and closing said cover guide openings an said horizontal wheel periphery being positioned for moving under the connection of said guide opening and said diverging guide opening.

References Cited

UNITED STATES PATENTS

| | | | |
|---|---|---|---|
| 180,400 | 7/1876 | Westcott | 104—134 |
| 372,792 | 11/1887 | Fransze | 104—240 |
| 467,346 | 1/1892 | Garland | 104—173 |
| 566,373 | 8/1896 | Bronsdon | 104—178 |
| 1,186,465 | 6/1916 | Bates | 104—173 |
| 2,660,127 | 11/1953 | Boyko | 104—140 |
| 1,704,012 | 3/1929 | Marx | 104—173 |
| 2,642,176 | 6/1953 | De Burgh | 104—172 X |
| 2,918,020 | 12/1959 | Henderson et al. | 104—172 |
| 3,072,073 | 1/1963 | Peterson et al. | 104—172 |

ARTHUR L. LA POINT, Primary Examiner

R. SAIFER, Assistant Examiner

U.S. Cl. X.R.

104—178